WITNESSES:

INVENTORS
Harry J. Lingal and
Russell E. Frink.
BY
ATTORNEY

Feb. 14, 1956    H. J. LINGAL ET AL    2,734,971
CIRCUIT INTERRUPTERS

Filed Sept. 4, 1952    5 Sheets-Sheet 3

WITNESSES:
E. A. McCloskey.
W. R. Crout

INVENTORS
Harry J. Lingal
and Russell E. Frink.
BY
Ralph H Swingle
ATTORNEY

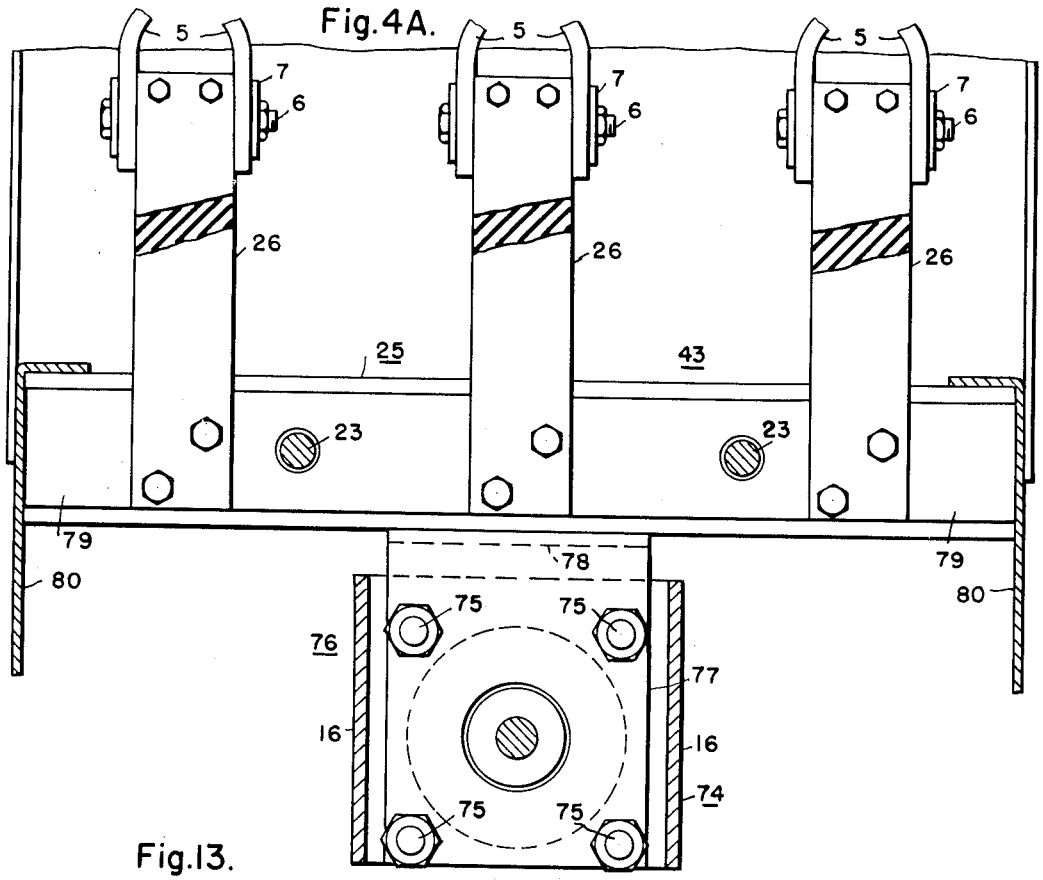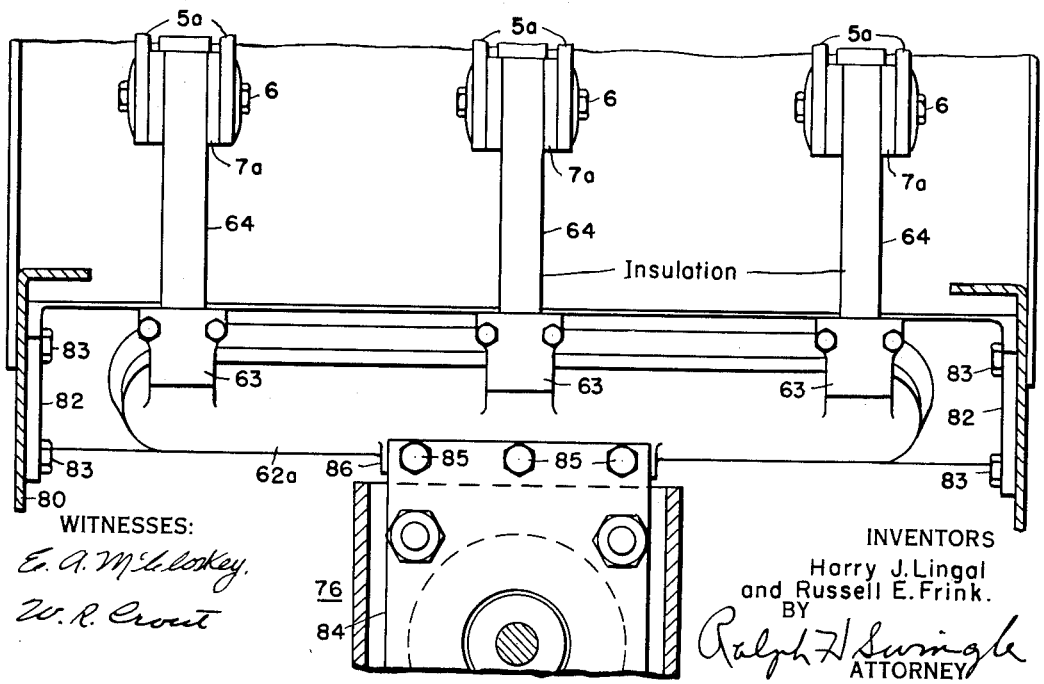

United States Patent Office 2,734,971
Patented Feb. 14, 1956

2,734,971

CIRCUIT INTERRUPTERS

Harry J. Lingal and Russell E. Frink, Pittsburgh, Pa., assignors to Westinghouse Electric Corporation, East Pittsburgh, Pa., a corporation of Pennsylvania Application September 4, 1952, Serial No. 307,812

18 Claims. (Cl. 200—148)

This invention relates generally to circuit interrupters, and, more particularly, to arc-extinguishing structures therefor.

In United States Patent 2,491,964, issued December 20, 1949, to Russell E. Frink, and assigned to the assignee of the instant application, there is described and claimed a novel form of gas-blast device or "puffer," associated with an air-break circuit interrupter to more efficiently and rapidly bring about circuit interruption, particularly of low-value currents, such as transformer-magnetizing currents, or the like. It is a general object of our invention to improve upon such a device and to make it more efficient in operation.

Another object of our invention is to provide a circuit interrupter, particularly one of the air-break type, which will be more effective and rapid in its interrupting performance than those heretofore manufactured.

A more specific object of our invention is to provide an improved auxiliary puffer for a circuit interrupter of the air-break type.

Still another object is to provide an improved puffer for a circuit interrupter of the air-break type, in which non-linear piston travel, relative to the contact travel, is obtained, so that during the initial portion of the opening stroke a strong blast of air is obtained adjacent the contact structure to effect arc extinction.

A further object of our invention is to provide an improved nozzle configuration, in combination with the arc chute proper, so that a more effective gas blast may be directed within the arc chute to prevent the arc from side-stepping the blast.

Yet a further object of our invention is to provide an improved piston arrangement for an auxiliary puffer device, which will utilize the several components thereof as structural support members.

A more specific object is to provide an elongated piston cylinder extending across the poles of a multi-pole breaker, in which the cylinder forms a brace for the circuit interrupter frame, and to which may be bolted, or otherwise secured, supports for the contacts, or even the operating mechanism itself.

Yet another object is to provide an improved toggle operating arrangement for mechanically effecting contact separating movement and also piston travel, correlating the two in a desired manner.

Further objects and advantages will readily become apparent upon reading the following specification, taken in conjunction with the drawings, in which:

Figure 1 is a side elevational view, partially in section, and somewhat diagrammatic, illustrating an application of our invention to a circuit interrupter of the air-break type, the contact structure being shown in the closed-circuit position;

Fig. 2 diagrammatically represents the toggle employed in the operating arrangement illustrated in Fig. 1, the contact structure being shown in the closed-circuit position;

Fig. 4A is a fragmentary front elevational view of the piston cylinder serving as a brace in the breaker frame and taken generally on the line IVA—IVA of Fig. 1;

Figure 7:
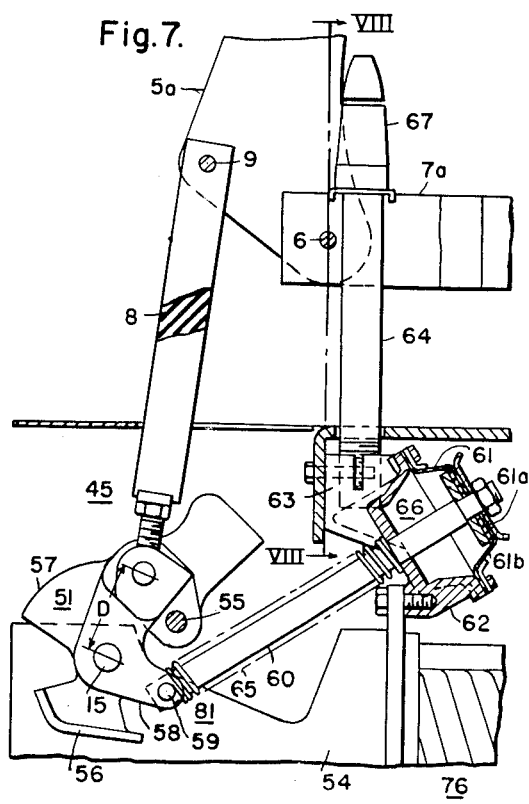
Fig. 7 is a side elevational view, partially in section, of a modified type of circuit interrupter embodying our invention and shown in the closed-circuit position.
Figure 10:
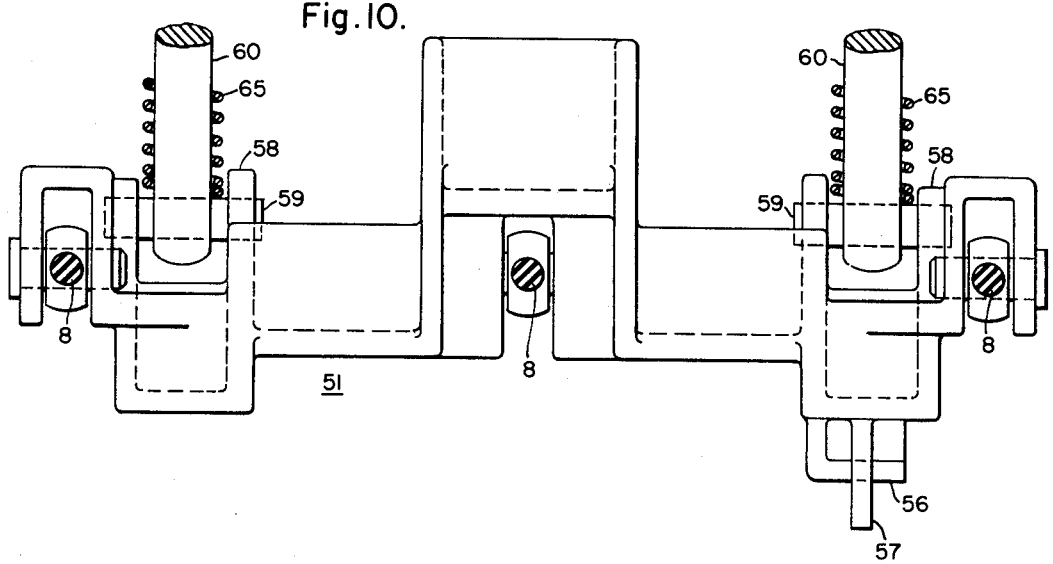
Figure 11:
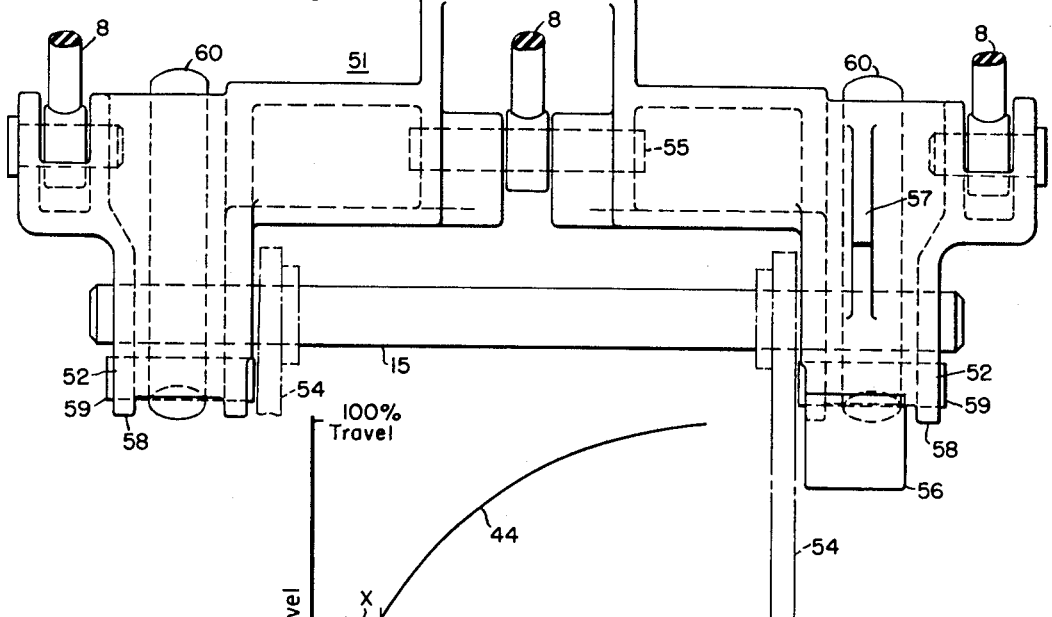
Figure 12:
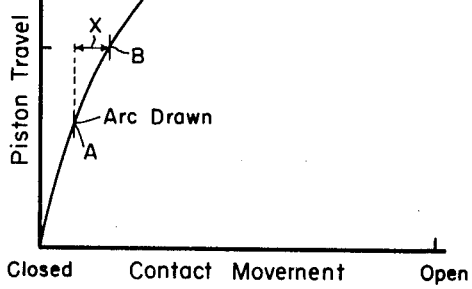

Figs. 10 and 11, respectively, illustrate top and front elevational views of an operating-lever casting, utilized in the modified type of circuit interrupter shown in Fig. 7;

Fig. 12 is a curve depicting the non-linear piston travel; and

Figure 9:
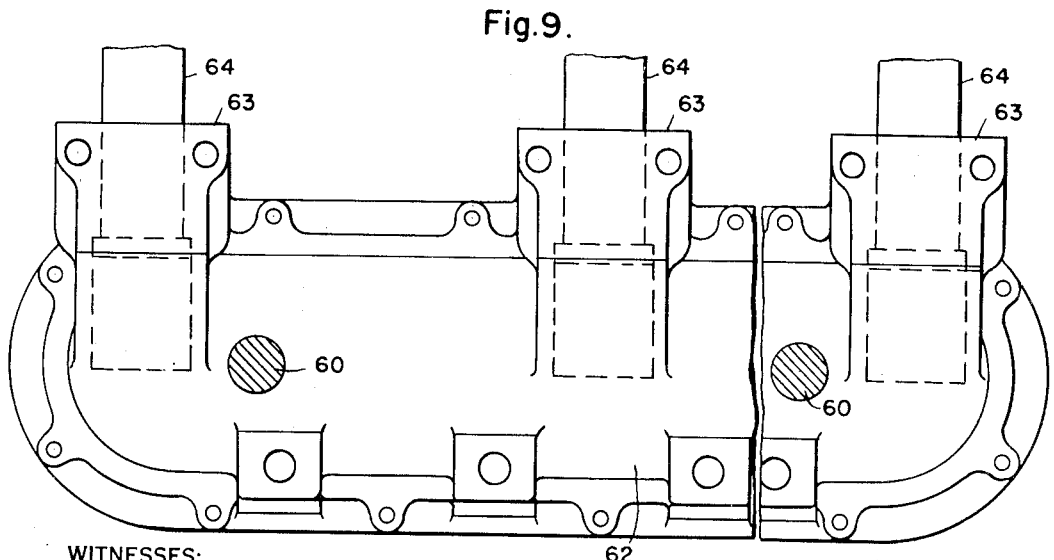
Fig. 9 is an enlarged fragmentary front elevational view of the puffer-operating cylinder or casing.

Fig. 13 is a front elevational view of the modified type of puffer-operating cylinder, similar to that of Fig. 9, and showing its use as a main brace in the circuit breaker frame.

Referring to the drawings, and more particularly to Figs. 1–6 thereof, the reference numeral 1 generally designates a circuit interrupter of the air-break type embodying stationary terminal bushings 2, 3, which may be supported upon any suitable framework. Associated with the extremity of the upper terminal bushing 2, is a stationary contact 4. Cooperable with the stationary contact 4 is a hook-shaped movable contact 5, pivotally mounted upon a pin 6, the latter being supported on a bracket structure 7, disposed at the extremity of the terminal bushing 3.

Figure 1:
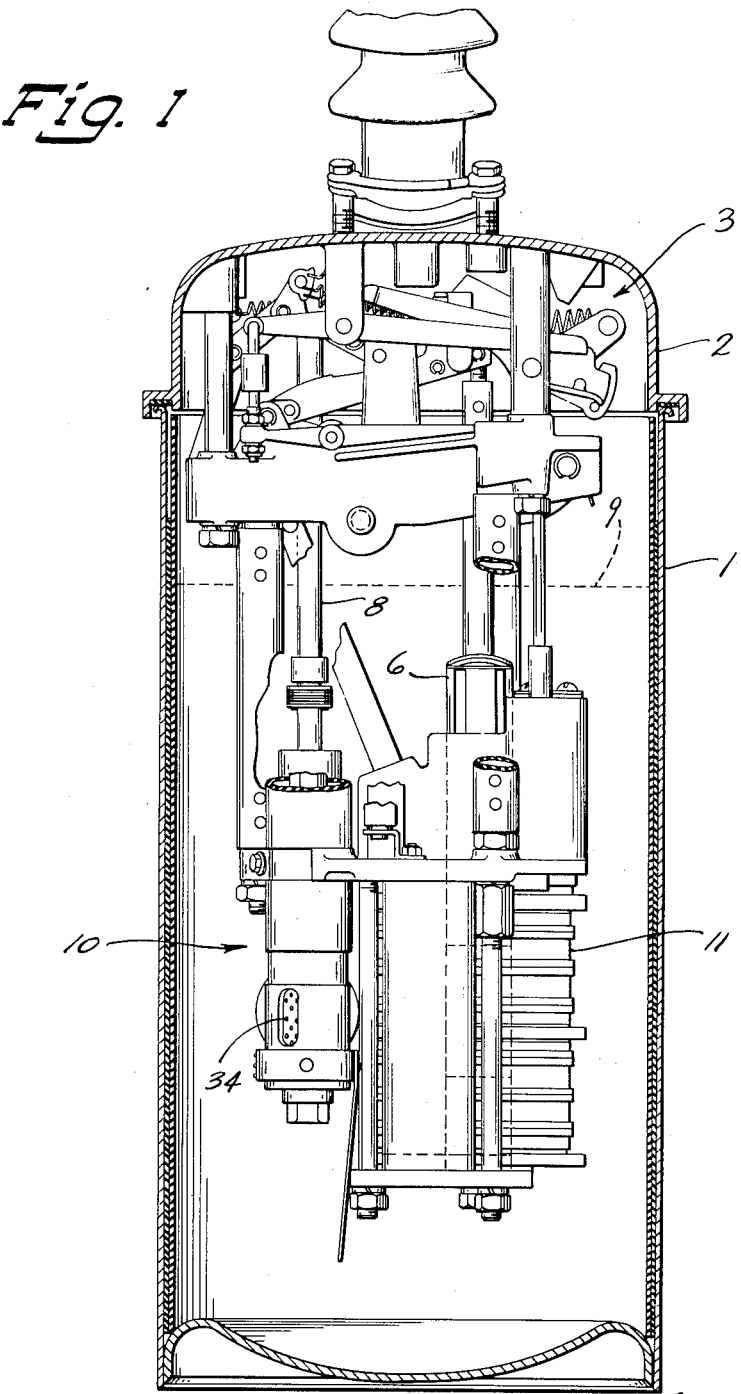

In the closed-circuit position of the device, as shown in Fig. 1, the circuit extends through the terminal bushing 2, to stationary contact 4, thence through the movable contact 5 and through the conducting bracket or support 7 to the terminal bushing 3, and hence to the external circuit.

An insulating operating rod 8 is provided, pivotally connected to the movable contact 5, as at 9, to effect the actuation thereof. The lower end 10 of the insulating operating rod 8 is adjustably secured, as by nuts 11, to an angle-shaped crossbar 12, the latter extending across the three poles of the interrupter. In other words, the interrupter is, in this instance, a three-pole breaker, as more clearly shown in Fig. 4A, controlling a three-phase circuit having the customary three pairs of contacts. All of the contacts 5 are operated to the open and closed positions by a plurality of operating rods 8, only one of which is shown, the rods 8 being adapted for simultaneous actuation by the movement of the crossbar 12, which, in this instance, extends substantially horizontally across the front of the breaker, and to which the lower ends 10 of the operating rods 8 are adjustably secured.

The angle-shaped crossbar 12 is pivotally connected, as at 13, to an operating lever casting 14, the latter being pivotally mounted about an operating shaft 15. The shaft 15 is stationary, and is supported between the legs 16 of a U-shaped mounting plate 74, the bight portion of the latter being secured by iron rods 75 to a horizontally-extending solenoid 76. An L-shaped plate 77 is also secured to the rods 75 (Fig. 4A), and has its upper side 78 bolted to a piston cylinder 25, hereinafter described.

and the arc is initially established. At the point B, where the piston has moved half its travel, it will be observed that the arc length is only the small amount X, which is approximately 10 or 12% of the total contact separation distance. As a result of the non-linear relationship there is a strong blast of air at the beginning of the arc lengthening movement, which is highly beneficial to the interruption of low currents.

Fig. 2 illustrates, by means of a toggle diagram, how the non-linear relationship is brought about. Referring to this figure, it will be observed that the toggle 45, comprising the toggle links 8 and 14, is in the slightly underset position, in the closed-circuit position of the interrupter, as shown in Fig. 1. Consequently, at the beginning of the opening stroke, the movable contact 5 only moves slightly in accordance with rotative movement of the toggle link 14. On the other hand, the toggle 46, comprising the toggle links 14a and 18, is substantially at a right-angle position, so that for a slight rotative movement of the link 14a, the piston operating lever 20 moves a considerable distance.

From the foregoing diagram, it is apparent that the toggles 45, 46 are in such relationship that if we have a constant rotative speed of travel of the lever 14, there is a tremendous difference in the velocity of piston movement as compared with contact separating movement. This feature is highly important in obtaining a strong blast at the initial portion of the opening stroke.

Figure 3:
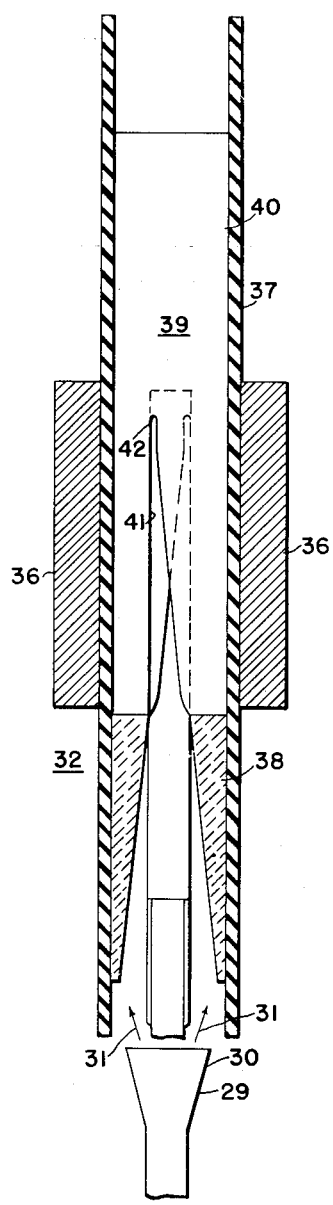
Fig. 3 is a vertical sectional view taken along the line III—III of Fig. 1, looking in the direction of the arrows.
Figure 4:
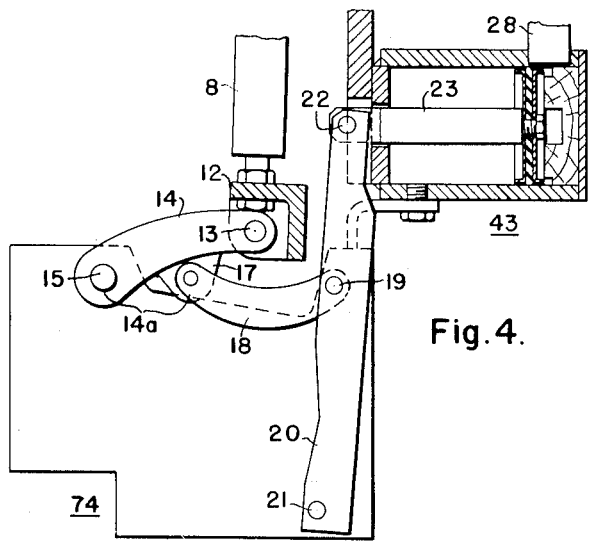
Fig. 4 is a fragmentary view, partially in section, showing the piston-operating arrangement of Fig. 1 in the fully-open-circuit position.
Figures 5, 6:
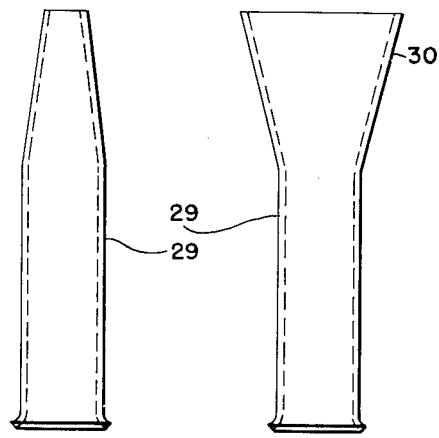
Figs. 5 and 6 show, respectively, side and front views of our improved nozzle arrangement for effectively directing the gas blast into the arc-chute structure.

The dotted-line position of the piston 24, as indicated by the reference character 47 in Fig. 1, indicates the amount of travel of the piston 24 at the time that the movable contact 5 has reached the dotted position 48. As the fully-open poisition is approached, the pivots of the toggle links 14a and 18 reach an almost straight line position as shown in Fig. 4, so that there is very little additional movement of the piston 24 even though the movable contact member 5 has a large amount of movement. In the fully-open-circuit position of the interrupter, the piston 24 assumes the position indicated in Fig. 4, at which time the movable contact 5 has reached the dotted-line position 49 in Fig. 1. Thus, the dotted positions 47, 48 clearly indicate, in a structural manner, the rapid speed of movement of the piston 24 during the initial portion of the opening stroke, when the movable contact 5 has only reached the position designated by the dotted line 48 in Fig. 1.

Fig. 7 illustrates the closed-circuit position of an alternative form of circuit interrupter embodying our invention. The movable contact 5a actually comprises a pair of plates, indicated in Fig. 8. The movable contact 5a is pivoted, as at 6, upon a bracket member 7a. The stationary contact is not shown but it may be similar to that illustrated in Fig. 1. An operating rod 8, composed of insulating material, has its upper end pivotally connected, as at 9, to the movable contact 5a, and has its lower end adjustably secured to an operating-lever casting 51, the configuration of which is more clearly shown in Figs. 10 and 11 of the drawings.

As in the first embodiment of our invention, there are three such operating rods 8, as indicated in Figs. 10 and 11, and they are all pivotally mounted upon the same casting 51. This casting 51 has two depending integrally-formed support portions 52, apertured to accommodate the operating shaft 15. In this instance, the shaft 15 is mounted upon a pair of spaced support plates 54, as shown in Fig. 11. The operating mechanism which causes rotative movement of the casting 51, is linked thereto by a pin 55 (Fig. 7), which is equivalent to the pin 93 in Figs. 2 and 3 of Patent 2,515,994, hereinbefore referred to. At the right-hand end of the casting 51 is an indicating plate 56, having "open" and "closed" circuit labels affixed thereto, which may show through a slot in a door of the circuit breaker housing to indicate to an observer the open or closed-circuit position of the interrupter. The casting 51 also has an interlocking portion 57, which interlocks with mechanism, not shown, to prevent opening and closing of the breaker, unless the interrupter 1 is completely closed within its cubicle, or removed therefrom.

The casting 51 also has an integrally-formed pair of bifurcated lug portions 58, apertured to accommodate a pair of pins 59, more clearly shown in Fig. 7. The pins 59 are each pivotally connected to one of the two piston rods 60. At the right-hand ends of the piston rods 60, as viewed in Fig. 7, is an elongated diaphragm piston 61, which moves within an elongated operating cylinder 62. The diaphragm piston 61 comprises a rigid piston member 61a connected to the piston rod 60 and a diaphragm member 61b of flexible material fastened at its edges to the cylinder 62. The piston and cylinder each have a width several times their height and also several times greater than the stroke of the piston and extend across the front of the three poles of the three-phase breaker, as indicated in Fig. 9 of the drawings. Preferably, the operating cylinder 62 is formed as a casting, as shown, and has a plurality of fluid connectors 63, into which are fitted the lower ends of three insulating blast tubes 64, as more clearly shown in Figs. 7, 9 and 13 of the drawings. Thus, the three blast tubes 64 are pneumatically connected with the same operating-cylinder casting 62, extending across the front of the breaker.

By the constructions of the operating cylinders 25, 62, as shown in Figs. 1 and 9, there arises the advantage that the gas has less vertical distance to travel than if the operating cylinders 25, 62 were circular. If such operating cylinders were circular in construction, the blast generated at the lower end of such a circular operating cylinder would have a greater vertical distance to travel, as would be obvious, as compared to the elongated constructions shown in Figs. 1, 7 and 9 of the drawings, in which such vertical distance is cut down to a minimum, thereby diminishing energy losses due to the friction of movement of the gas blast.

Encircling the two piston rods 60, connected to the casting 51 adjacent the opposite ends thereof, are a pair of piston compression springs 65, which are compressed during the closing stroke. During the opening stroke, these compression springs 65 assist the working travel of the diaphragm piston 61 in compressing the gas within the region 66 of the operating cylinder 62. The material composing the diaphragm 61b of the piston 61 is preferably strong mechanically, yet resistant to the passage of gas therethrough. Any such material may be used, one such material being canves impregnated with a vulcanized rubber.

Figure 8:
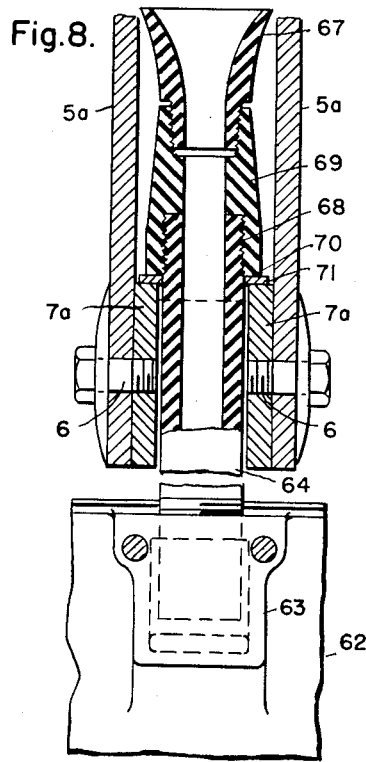
Fig. 8 is an enlarged fragmentary front elevational view of the circuit interrupter of Fig. 7, taken along the line VIII—VIII of Fig. 7, looking in the direction of the arrows.

The nozzles 67 employed in this construction of our invention have the same fan-shaped configuration as indicated heretofore. However, a distinct advantage of the construction, set out in Fig. 7, is that the three blast tubes 64 serve as tension support members to relieve the vertical stress imposed upon the brackets 7a when the contacts 5a move into the closed position. In moving into closed position, it is obvious that the toggle 45, comprising the toggle links 8, and the effective portion "D" (Fig. 7) of the casting 51, moves into a slightly underset position, as shown in Fig. 7, thereby exerting tremendous vertical cantilever forces upon the brackets 7a associated with the three lower terminal bushings 3. These bending stresses exerted on the brackets 7a are counteracted by the tensile strength exerted by the three blast tubes 64. As indicated in Fig. 8, the blast tubes 64 are externally threaded, as at 68, to secure tubular members 69 thereto. The tube 69 has a shoulder portion 70, upon which seats a washer 71. The washer 71 seats upon the bracket 7a. Hence, any vertical stresses imposed upon the front ends of bracket 7a react upon the washer 71 and hence through the blast tube 64. The tensile strength of the blast tube 64, therefore, effectively counteracts the bending forces exerted on the brackets 7a, as the movable contacts 5a near their closed positions.

It will be noted that the piston 61 of the interrupter of Fig. 7 has a non-linear piston travel, as was the case with the piston 24 of the interrupter of Fig. 1. Thus, the toggle 45 is slightly underset in the closed circuit position, as shown in Fig. 7, and hence the movable contacts 5a begin their opening motion relatively slowly. On the other hand the toggle 81, comprising the links 58 and 60 is substantially at a right-angle position, so that for a slight rotative movement of the casting 51, the piston 61 moves a considerable distance.

Fig. 13 illustrates how the elongated operating cylinder 62a may serve as the main lateral structural brace of the circuit breaker frame. It will be observed that angle lug portions 82 are integrally formed with the casting 62a. Bolts 83 secure the casting 62a to the channels 80 of the circuit breaker frame. The solenoid mechanism 76 may be bolted to the casting 62a by a plate 84, similar to the mounting plate 77 of Fig. 4A. As shown, bolts 85 secure the plate 84 to a lug extension 86 of the operating cylinder 62a.

From the foregoing it will be apparent that we have described an improved air-blast device for use on magnetic air circuit breakers to speed up the interruption of low currents. It is apparent to those skilled in the art that the force exerted by the field on the arc is proportional to the product of the current and the field strength. For very low currents (such as transformer magnetizing currents), the field strength is also very low, and since the product of two low members is a still lower number, the force on the arc is almost negligible, and the breaker may arc for 40 or 50 cycles before interruption is accomplished. To reduce this arcing time, various auxiliary air devices have been used. However, in many forms they have been ineffective or complicated in construction.

The foregoing auxiliary air devices of our invention have been demonstrated on tests to reduce the arcing time to a very low value, say of the order of 3 cycles for low-current interruption. The foregoing arrangements are such that the greatest part of the air in the cylinders is delivered to the interrupting region early in the contact opening stroke, hastening the early interruption of the arc. Also we have provided a fan-shaped nozzle so as to force the air stream to pass upwardly through the full width of the arc chute in the vicinity of the arc. The velocity of the air stream is undiminished because of the constant cross-sectional area through the tube. By virtue of the non-linear piston travel, high speed interruption has resulted as shown by actual tests upon breakers of the type indicated.

We have also disclosed a novel form of pneumatic cylinder which diminishes gas losses through friction and which may, by itself alone, serve as the main lateral structural brace in the circuit breaker frame.

Although we have shown and described specific structures, it is to be clearly understood that the same were merely for the purpose of illustration, and that changes and modifications may readily be made therein, by those skilled in the art, without departing from the spirit and scope of the invention.

We claim as our invention:

1. A circuit interrupter including a movable contact for establishing an arc, a gas-blast device including a piston and a piston chamber, and a motion-amplifying mechanism interconnecting the movable contact with the gas-blast device causing a higher rate of change of relative movement between the piston and the piston chamber when the movable contact has moved slightly in the opening direction than when the movable contact has progressed to a position later in the opening stroke.

2. A circuit interrupter including a movable contact for establishing an arc, a gas-blast device including a piston and a piston chamber, and a motion-amplifying mechanism interconnecting motion of the movable contact with motion of the gas-blast device including one or more toggles causing a higher rate of change of relative movement between the piston and the piston chamber when the movable contact has moved slightly in the opening direction than when the movable contact has progressed to a position later in the opening stroke.

3. A circuit interrupter including a movable contact for establishing an arc, a gas-blast device including a piston and a piston chamber, and a motion-amplifying mechanism interconnecting motion of the movable contact with motion of the gas-blast device including a pair of interconnected toggles causing a higher rate of change of relative movement between the piston and the piston chamber when the movable contact has moved slightly in the opening direction than when the movable contact has progressed to a position later in the opening stroke.

4. A circuit interrupter including a movable contact for establishing an arc, a toggle for causing motion of the movable contact, a gas-blast device for assisting in the extinction of the arc, a second toggle for actuating the gas blast device, the first said toggle being substantially straight in the closed-circuit position of the interrupter so that initial breaking of the first said toggle will cause slow opening movement of the movable contact, the said second toggle being substantially broken in the closed-circuit position so that initial opening movement thereof will cause considerable movement within the gas-blast device, and means for connecting the two toggles for simultaneous movement.

5. A circuit interrupter including a movable contact for establishing an arc, a toggle for causing motion of the movable contact, a gas-blast device for assisting in the extinction of the arc, a second toggle for actuating the gas-blast device, the first said toggle being substantially straight in the closed-circuit position of the interrupter so that initial breaking of the first said toggle will cause slow opening movement of the movable contact, the said second toggle being substantially broken in the closed-circuit position so that initial opening movement thereof will cause considerable movement within the gas-blast device, means for connecting the two toggles for simultaneous movement, and one of the toggle links of the first said toggle having a portion thereof serving as one of the toggle links of the said second toggle.

6. A circuit interrupter including means for establishing an arc, an arc chute having spaced side walls extending lengthwise of the arc chute for extinguishing the arc, a gas-blast device including a fan-shaped nozzle for assisting in the extinction of the arc, the greater length of the fan-shaped nozzle extending transversely of the arc chute so that the arc may not avoid the blast, and the internal cross-sectional area of the nozzle remaining substantially constant to maintain the velocity of the gas blast.

7. A multi-pole circuit interrupter including a plurality of spaced pairs of contacts, a gas-blast device including a metallic operating cylinder having a bore with a greater lenght in one direction than in another, piston means associated with the operating cylinder, and the greater length of the bore of the metallic operating cylinder extending in a direction across the poles.

8. A multi-pole circuit interrupter including a plurality of spaced pairs of contacts, a gas-blast device including an elongated operating cylinder having a greater length in one direction than in another, an elongated piston cooperative with the elongated operating cylinder to build up pressure within the elongated operating cylinder, the greater length of the operating cylinder extending in a direction across the poles, and a plurality of piston rods for operating the elongated piston.

9. A multi-pole circuit interrupter including a plurality of spaced pairs of contacts, a gas-blast device including a piston and a single metallic operating cylinder, the metallic operating cylinder having a greater length in one direction than in another in a plane normal to the stroke of the piston, said greater length of the metallic operating cylinder extending in a direction across the poles, and a separate blast tube for each pair of contacts each communicating at one end with the single operating cylinder and at the other end with the space adjacent the particular pair of contacts, and the blast tubes being spaced along said greater length of the operating cylinder.

10. A multi-pole circuit interrupter including a plurality of spaced pairs of contacts, a gas-blast device including an elongated operating cylinder having a greater length in one direction than in another, an elongated piston co-operable with the elongated operating cylinder to build up pressure within the elongated operating cylinder, the greater length of the operating cylinder extending in a direction across the poles, a plurality of piston rods for operating the elongated piston, and a separate blast tube for each pair of contacts communicating at one end with the operating cylinder and at the other end with the space adjacent the contacts.

11. A circuit interrupter including means for establishing an arc, a gas-blast device having a metallic gas-blast cylinder with a bore having a length greater in one direction than in another, the gas-blast device sending a blast of gas toward the arc to facilitate the extinction of the same, piston means associated with the gas-blast cylinder, and the greater length of the bore of said metallic gas-blast cylinder extending substantially transversely to a line drawn between said means and said gas-blast cylinder to minimize losses due to fluid friction.

12. A multi-pole circuit interrupter including a plurality of spaced pairs of contacts, one of each pair of contacts being movable, a gas-blast device including an operating cylinder having a greater length in one direction than in another, the greater length of the operating cylinder extending in a direction across the poles, supporting means for at least one of the two contacts of each pair, a tubular fluid conduit for each pair of contacts, having one end secured to the operating cylinder for sending a blast of fluid toward the respective pair of contacts, operating means, linkage means interconnecting the operating means with the movable contact and exerting forces therealong during operation of the interrupter, and the fluid conduits serving as structural members in supporting said supporting means and counteracting said forces.

13. A multi-pole circuit interrupter including a plurality of spaced pairs of contacts, a gas-blast device including a single pressure-generating cylinder having a greater length in one direction than in another, the greater length of the cylinder extending in a direction across the poles, the cylinder serving as a structural support member, piston means associated with said cylinder, and means aiding in supporting one or more of the contacts from said cylinder.

14. A multi-pole circuit interrupter including a plurality of spaced pairs of contacts, a gas-blast device including a gas pressure chamber having a greater length in one direction than in another, the greater length of the gas pressure chamber extending in a direction across the poles, one or more of the contacts being pivotally mounted upon fixed pivots, piston means associated with the gas pressure chamber, the gas pressure chamber serving as a structural support member, and means supporting one or more of the pivots from said gas pressure chamber.

15. A multi-pole circuit interrupter including a plurality of spaced pairs of contacts, a gas-blast device including a single pressure-generating cylinder with a bore having a greater length in one direction than in another, piston means associated with the cylinder, the greater length of the bore of the cylinder extending in a direction across the poles, a unitary operating member extending across the poles, and means interconnecting one of the two contacts of each pair with the unitary operating member for simultaneously effecting the motion thereof.

16. A multi-pole circuit interrupter including a plurality of spaced pairs of contacts, a gas-blast device including a single pressure-generating cylinder having a greater length in one direction than in another, the greater length of the cylinder extending in a direction across the poles, a unitary operating member extending across the poles, means interconnecting one of the two contacts of each pair with the unitary operating member for simultaneously effecting the motion thereof, an elongated piston associated with said pressure-generating cylinder, and a plurality of piston rods for actuating said piston connected to the unitary operating member.

17. A multi-pole circuit interrupter including a plurality of spaced pairs of contacts, a gas-blast device including a single pressure-generating cylinder with a bore having a greater length in one direction than in another, the greater length of the bore of the cylinder extending in a direction across the poles, piston means associated with the cylinder, a unitary operating member extending across the poles, means interconnecting one of the two contacts of each pair with the unitary operating member for simultaneously effecting the motion thereof, and a blast tube for each pair of contacts pneumatically connected with the pressure-generating cylinder.

18. A circuit interrupter including a relatively stationary contact and a movable contact cooperable therewith to establish an arc, a gas-blast device including a gas pressure chamber and a movable piston associated therewith, a piston rod, a lever pivotally mounted on a stationary pivot and having one end connected to the piston rod, and a motion-amplifying mechanism interconnecting motion of the lever with motion of the movable contact for causing a higher rate of change of relative movement between the piston and the gas pressure chamber when the movable contact has moved slightly in the opening direction than when the movable contact has progressed to a position later in the opening stroke.

References Cited in the file of this patent

UNITED STATES PATENTS

| | | |
|---|---|---|
| 490,762 | Bentley | Jan. 31, 1893 |
| 525,332 | Card | Sept. 4, 1894 |
| 1,334,645 | Bechoff et al. | Mar. 23, 1920 |
| 2,280,616 | Baskerville | Apr. 21, 1942 |
| 2,310,779 | Hall et al. | Feb. 9, 1943 |
| 2,330,820 | Fernier | Oct. 5, 1943 |
| 2,347,984 | Baskerville | May 2, 1944 |
| 2,349,681 | Slepian | May 23, 1944 |
| 2,380,817 | Woolard | July 31, 1945 |
| 2,397,912 | Beldi | Apr. 9, 1946 |
| 2,399,485 | Harlow et al. | Apr. 30, 1946 |
| 2,491,964 | Frink | Dec. 20, 1949 |
| 2,552,427 | Heidmann | May 8, 1951 |

FOREIGN PATENTS

| | | |
|---|---|---|
| 200,158 | Switzerland | Dec. 16, 1938 |